(12) United States Patent
Davis et al.

(10) Patent No.: US 11,358,221 B2
(45) Date of Patent: Jun. 14, 2022

(54) BUILD PART AND METHOD OF ADDITIVELY MANUFACTURING THE BUILD PART

(71) Applicant: THE BOEING COMPANY, Chicago, IL (US)

(72) Inventors: Tyler Davis, Wildwood, MO (US); Stephanie Albanito, St. Louis, MO (US); Matthew J. Frizzell, Ballwin, MO (US)

(73) Assignee: THE BOEING COMPANY, Chicago, IL (US)

(*) Notice: Subject to any disclaimer, the term of this patent is extended or adjusted under 35 U.S.C. 154(b) by 288 days.

(21) Appl. No.: 16/588,171

(22) Filed: Sep. 30, 2019

(65) Prior Publication Data
US 2021/0094096 A1    Apr. 1, 2021

(51) Int. Cl.
*B22F 10/00* (2021.01)
*B33Y 80/00* (2015.01)
*B33Y 30/00* (2015.01)
*B33Y 10/00* (2015.01)

(52) U.S. Cl.
CPC ............... *B22F 10/00* (2021.01); *B33Y 10/00* (2014.12); *B33Y 30/00* (2014.12); *B33Y 80/00* (2014.12)

(58) Field of Classification Search
CPC .................................................. B29C 64/188
See application file for complete search history.

(56) References Cited

U.S. PATENT DOCUMENTS

| | | | |
|---|---|---|---|
| 6,623,687 B1* | 9/2003 | Gervasi | B29C 64/135 264/401 |
| 7,403,833 B2* | 7/2008 | Heide | B33Y 50/00 700/119 |
| 8,219,234 B2* | 7/2012 | Kritchman | B29C 64/188 700/62 |
| 8,903,533 B2* | 12/2014 | Eggers | B29C 64/40 700/119 |
| 9,713,843 B2* | 7/2017 | Snyder | B23K 15/0086 |
| 9,849,510 B2* | 12/2017 | Lacy | B23K 26/342 |
| 10,596,762 B2* | 3/2020 | Sauer | B33Y 10/00 |
| 10,996,651 B2* | 5/2021 | Deslandes | B29C 64/393 |
| 2006/0003095 A1* | 1/2006 | Bullen | C23C 24/10 427/180 |
| 2013/0156549 A1* | 6/2013 | Maldonado | F01D 9/041 415/115 |
| 2014/0251585 A1* | 9/2014 | Kusuda | F28D 15/04 165/164 |

(Continued)

FOREIGN PATENT DOCUMENTS

WO    WO-2013160198 A1 *  10/2013   ............. B22F 5/106

*Primary Examiner* — Jacob J Cigna
(74) *Attorney, Agent, or Firm* — The Small Patent Law Group LLC; Philip S. Hof (57) ABSTRACT

A build part has a body that is additively manufactured on a platform. The body is defined by multiple layers of material consecutively stacked along a build axis and fused together. The body defines one or more fluid channels for directing fluid through the body. Each of the one or more fluid channels is oriented such that a centerline of the respective fluid channel is angled no greater than a maximum offset angle relative to the build axis throughout the length of the fluid channel. The maximum offset angle is no greater than 75 degrees.

20 Claims, 5 Drawing Sheets

(56) References Cited

U.S. PATENT DOCUMENTS

| | | | |
|---|---|---|---|
| 2014/0305529 A1* | 10/2014 | Kroll | B22F 10/20 |
| | | | 138/111 |
| 2016/0303656 A1* | 10/2016 | Lacy | B22F 10/20 |
| 2016/0332229 A1* | 11/2016 | Snyder | F01D 5/18 |
| 2017/0219134 A1* | 8/2017 | Kedor | F16L 9/19 |
| 2018/0150059 A1* | 5/2018 | Deslandes | B29C 64/40 |
| 2019/0248064 A1* | 8/2019 | Smith | B29C 64/10 |
| 2019/0375011 A1* | 12/2019 | Nakamura | B22F 5/007 |
| 2020/0130101 A1* | 4/2020 | Jones | B33Y 10/00 |
| 2021/0003095 A1* | 1/2021 | Tessiereau | B22F 10/20 |
| 2021/0008624 A1* | 1/2021 | Ovaere | B22F 5/009 |
| 2021/0154927 A1* | 5/2021 | Snider | B29C 64/188 |

\* cited by examiner

BUILD PART AND METHOD OF ADDITIVELY MANUFACTURING THE BUILD PART

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of base material are deposited under computerized control. The deposited layers are selectively fused via the application of an energy input, such as a laser, which heats and bonds the material. The size and shape of the build part can be based on a three-dimensional computer model or another electronic data source. Additive manufacturing can be used to fabricate objects that have complex structures and/or shapes. Additive manufacturing techniques for fabricating metal build parts can be less labor intensive, allow greater design freedom, and yield more precise and repeatable finished products than conventional metal manufacturing techniques, such as die-casting, extruding, and the like.

A known challenge with additively-manufacturing build parts that include internal voids and/or protruding appendages is providing sufficient mechanical support for overhanging features of the structure during the build process. For example, overhanging features of semi-complete cavities and/or appendages may not adhere correctly and/or may deform due to the force of gravity. Furthermore, temperature gradients and phase changes as the fused layers cool down cause internal stresses within the build part, particularly with metal parts. The internal stresses can thermally contract and/or distort the structure causing irregularities that deviate from the intended shape in the build plan. As a result, the build part may have to be scrapped or may require extensive post-processing to remedy the irregularities.

Overhanging features are typically supported and secured in place during the additive manufacturing build process by controlling the additive manufacturing system to produce supports, such as block supports, tension support rods, and the like. For example, internal supports are formed inside voids, such as openings, channels, cavities, recesses, and the like, to maintain the structural shape of the voids and support and enable the formation of overhanging portions (e.g., ceilings) of the voids.

However, the support material within the internal voids of the build part can be difficult to remove during post-processing after the additive manufacturing process is complete. The internal support material may need to be cut and grinded away from the surfaces of the build part, which can be very difficult to do in internal cavities that are difficult to access. The arduous task of removing the internal support material during post-processing reduces manufacturing efficiency and increases production costs. Furthermore, residual metal left within internal cavities and other voids after the post-processing may negatively impact the performance of the build part, such as by interfering with fluid flow. For applications in which the internal cavities are pressurized, any features that result in a non-smooth cavity wall, such as residual metal left over from the internal supports, could render the cavity wall susceptible to high stress concentration.

SUMMARY OF THE DISCLOSURE

Certain embodiments of the present disclosure provide a build part including a body that is additively manufactured on a platform. The body is defined by multiple layers of material consecutively stacked along a build axis and fused together. The body defines one or more fluid channels for directing fluid through the body. Each of the one or more fluid channels is oriented such that a centerline of the respective fluid channel is angled no greater than a maximum offset angle relative to the build axis throughout the length of the fluid channel. The maximum offset angle is no greater than 75 degrees.

Optionally, the maximum offset angle is be no greater than 60 degrees. Optionally, the build axis is orthogonal to a build surface of the platform. Optionally, the body is free of internal support structures within the one or more fluid channels while being additively manufactured on the platform. Optionally, at least a subset of the one or more fluid channels has a circular cross-sectional shape. The body optionally is composed of at least one metal.

Certain embodiments of the present disclosure provide a method that includes additively-manufacturing a build part by consecutively depositing and fusing layers of material in a stack oriented along a build axis. The layers of material are consecutively deposited and fused according to a build plan to define one or more fluid channels through the build part for directing fluid through the build part. The layers of material are consecutively deposited and fused to orient each of the one or more fluid channels such that a centerline of the respective fluid channel is angled no greater than a maximum offset angle relative to the build axis throughout the length of the fluid channel. The maximum offset angle is no greater than 75 degrees.

Certain embodiments of the present disclosure provide a method that includes producing a design for a build part that includes fluid channels extending through a body of the build part. The build part is designed with a constraint that centerlines of the fluid channels, throughout the respective lengths of the fluid channels, are angled no greater than a maximum offset angle relative to a selected axis of the build part. The maximum offset angle is no greater than 75 degrees. The method also includes selecting an orientation for the build part relative to a build surface of a platform such that the selected axis of the build part is orthogonal to the build surface. The method further includes generating, via one or more processors, a build plan based on the design and the orientation. The build plan includes instructions for an additive manufacturing system to produce the build part on the platform.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an additively-manufactured build part and methods of additively-manufacturing the build part. The build part is produced via an additive manufacturing process to define one or more fluid channels through the build part. The characteristics of the fluid channels, such as shape, cross-sectional dimension size, curvature, and the like, are such that internal support structures would be expected to be used during the construction process to support the internal walls and maintain the shape. However, the build part is designed and oriented to obviate the need for internal support structures within the fluid channels during the additive manufacturing process, without compromising the structural integrity or increasing the risk of distortion.

The build part is designed and oriented on a build platform such that the fluid channels have controlled angles relative to a build direction. The build direction represents the direction in which the size of the build part increases during the manufacturing process as additional layers are fused and is typically along a vertical axis parallel to the force of gravity. In one or more embodiments, the additive manufacturing process is planned such that the fluid channels are oriented within a designated angular range of the build direction. In a non-limiting example, the designated range is 0 degrees to 75 degrees, where 75 degrees represents a maximum offset angle. The maximum offset angle can be specified to prevent overhanging features of the fluid channels extending at, or almost at, right angles relative to the build direction (e.g., the direction of gravity). The build part can still be formed to include right angle intersections and bends along the fluid channels, if warranted, by orienting the build part relative to the platform such that both segments of the fluid channel extending from the bend are within the designated angular range of the build direction, as described herein.

In at least one embodiment, the build part is free of internal support structures. As a result, the post-processing stage is substantially more efficient because there is no internal support structure to remove from the fluid channels by cutting and grinding. Furthermore, the build part is not limited to only linear fluid channels with a single shape and size. Rather, the fluid channels can have various sizes, shapes, trajectories, and the like, while the manufacturing process still either entirely avoids or at least substantially reduces the production of internal support structures within the channels. Eliminating the post-processing step of removing internal support structures from voids in a build part increases manufacturing efficiency by reducing processing time and costs. The embodiments described herein can also be applied to produce build parts that do not completely lack internal support structures within voids, but the internal support structures may be smaller, fewer, and/or easier to access and remove than known additively-manufactured build parts. As a result, enhanced manufacturing efficiency can still be achieved.

In at least one embodiment, the systems and methods described herein can provide a build part with application-specific dimensions and shapes of internal fluid channels. For example, internal fluid channels with round cross-sections are achievable. The round cross-sections are desirable from a strength perspective to withstand compression, fluid pressure, and/or the like. Fluid channels with other desirable dimensions and shapes, based on the specific application, can also be achieved.

Figure 1:
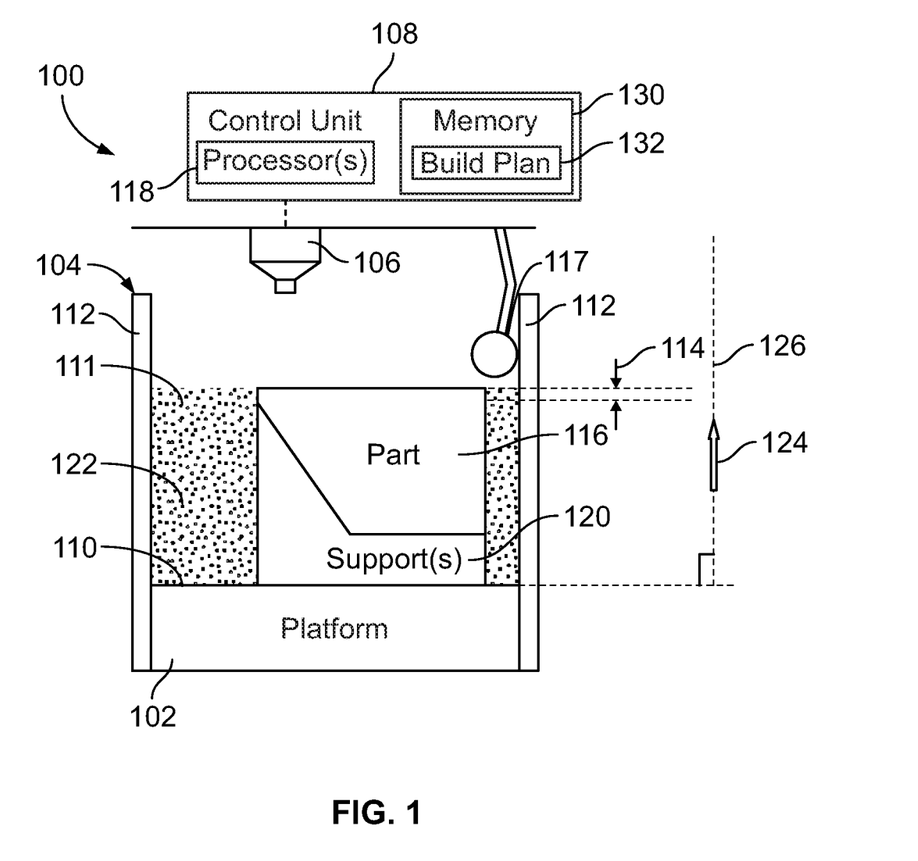
FIG. 1 is a schematic illustration of an additive manufacturing system according to an embodiment.

FIG. 1 is a schematic illustration of an additive manufacturing system 100 according to an embodiment. The additive manufacturing (AM) system 100 includes a platform 102, an enclosure 104, an electromagnetic energy source 106, and a control unit 108. The AM system 100 is configured to perform additive manufacturing build processes to form three-dimensional build parts 116, also referred to herein as parts. The parts 116 are built up from a build surface 110 of the platform 102 by selectively depositing a material 111 (e.g., a source material) in consecutive layers 114 and fusing the source material 111 at designated locations according to a build plan. Each layer 114 is relatively thin, such as no greater than 1 mm, no greater than 0.5 mm, no greater than 0.25 mm, or the like.

The AM system 100 in FIG. 1 can be utilized to perform powder bed fusion additive manufacturing techniques, such as selective laser melting (or sintering). For example, the source material 111 is a powder. In a non-limiting example, the powder includes one or more metals in the form of metal particles, flakes, or the like. The powder optionally can also include non-metallic filler materials intermixed with the metal material. The metal material may include various metal types, such as aluminum, stainless steel, copper, nickel, cobalt, titanium, or the like, and alloys of the various metal types. Possible non-metallic filler materials within the powder can include ceramics, polymers (e.g., plastics), silica, or the like. The powder that is deposited but is not fused to form part of the build part 116 is contained within walls 112 of the enclosure 104 to define a powder bed 122 of unused material 111. In an embodiment, the part 116 is encased within the powder bed 122 during the build process.

The part 116 is gradually generated by aggregating layers 114 in a build direction 124 along a build axis 126. With each successive addition of material 111 to the top of the part 116, the part 116 grows in the build direction 124. The build direction 124 extends away from the platform 102. In the illustrated embodiment, build axis 126 is orthogonal to the build surface 110 of the platform 102.

The AM system 100 generates new layers of the part 116 by spreading a thin layer or stratum of the powder material 111 over the top of the part 116. For example, a source material applicator 117 of the AM system 100 deposits each layer 114 of material 111. The source material applicator 117 includes or represents a spreader or re-coater device that evenly spreads a thin layer of the material 111, an injector that injects the material 111, or the like. The material 111 can be stored in a reservoir prior to use. The source material application 117 is controlled by the control unit 108.

Then, the electromagnetic energy source 106 is controlled by the control unit 108 to emit electromagnetic energy towards the material 111 in the top layer 114 to fuse designated portions of the material 111 to the part 116, defining a new layer or fraction of the part 116. The electromagnetic energy can be in the form of energy beams that impinge upon the stratum of the powder, causing a selected portion of the stratum to adhere to the part 116 and form a new top portion thereof. In an embodiment, the electromagnetic energy source 106 is suspended above the top of the powder bed 122 and is movable relative to the power bed 122 according to control signals received from the control unit 108. The process repeats consecutively according to instructions within the build plan until the part 116 is fully formed.

In an embodiment, the AM system 100 forms one or more external supports 120 during the build process for structurally supporting overhanging features of the part 116. The one or more external supports 120 are additively formed during the same build process that forms the part 116. For example, the part 116 and the external supports 120 are both composed of a series of stacked material layers that are fused together during an additive manufacturing build process. Optionally, the internal structure (e.g., density, lattice, etc.) and/or material composition of the external supports 120 differs from the part 116.

The control unit 108 includes one or more processors 118 that are configured to operate based on programmed instructions. The control unit 108 also includes a data storage device (e.g., memory) 130. The memory 130 stores programmed instructions (i.e., software) that dictates the functioning of the one or more processors 118. For example, the memory 130 stores a build plan 132 associated with the part 116 that is being fabricated. In an embodiment, the build plan 132 is based on a data file, such as a computer-aided design (CAD) file, that describes the physical characteristics or design of the part 116. In addition to the part design, the build plan according to an embodiment dictates other parameters for the build process, such as a part orientation relative to the platform 102, and a sequence of actions to take to build the part 116. The control unit 108 (e.g., the one or more processors 118 thereof) controls the operations of the electromagnetic energy source 106, the source material applicator 117, and/or other components based on the build plan 132 to produce the part 116 as a replica of a digital object in the data file. The control unit 108 is optionally communicatively connected to an input-output (I/O) device and/or a wireless communication device for receiving the data file and/or the build plan 132.

In one embodiment, the build plan 132 is generated remotely, such as at a discrete computer, and is transmitted to the AM system 100. The control unit 108 receives and stored the build plan 132, and then operates based on the instructions designated in the build plan 132. In another embodiment, the one or more processors 118 are configured to generate the build plan 132. For example, the data file representing the intended design of the part 116 can be received and utilized by the one or more processors 118 to select the build orientation and sequence of actions to build the part 116. The data file of the design can be received from a remote computing device or generated locally via operator inputs on an integrate I/O device.

Powder bed fusion is only one of multiple different types of additive manufacturing processes with which the embodiments described herein can be utilized. Non-limiting examples of other applicable additive manufacturing processes include binder jetting, material jetting, VAT photopolymerization, and the like.

Figure 2:
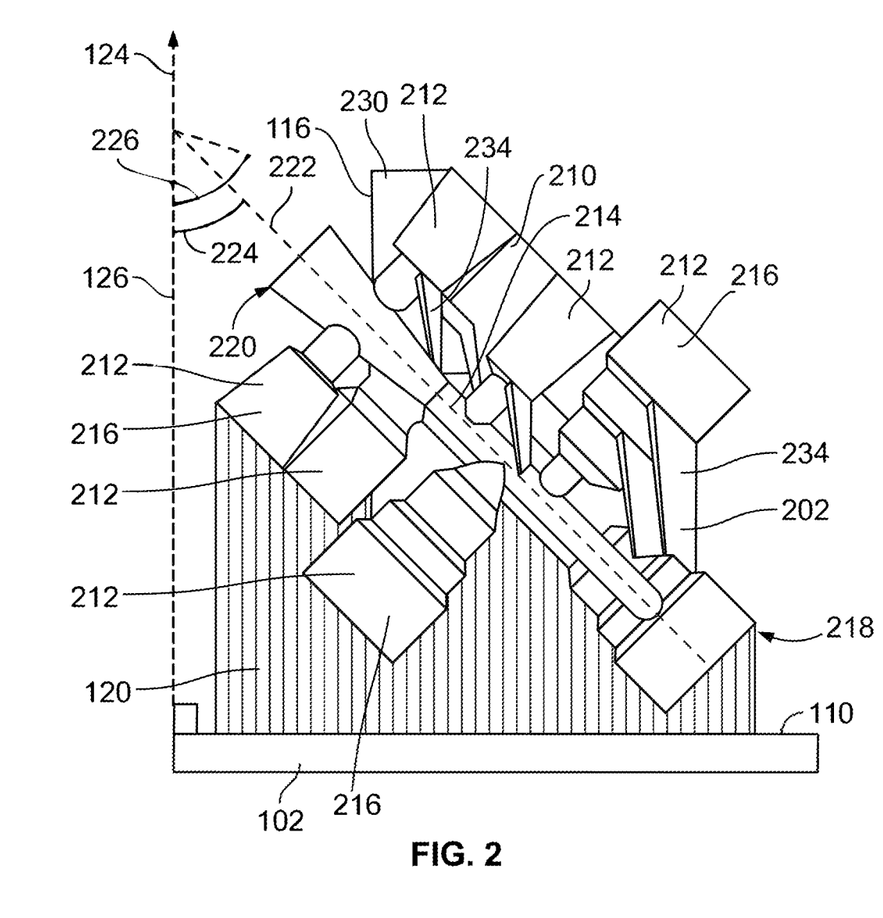
FIG. 2 is a front-facing view of an additively-manufactured build part, according to an embodiment, disposed on a platform of the additive manufacturing system.
Figure 3:
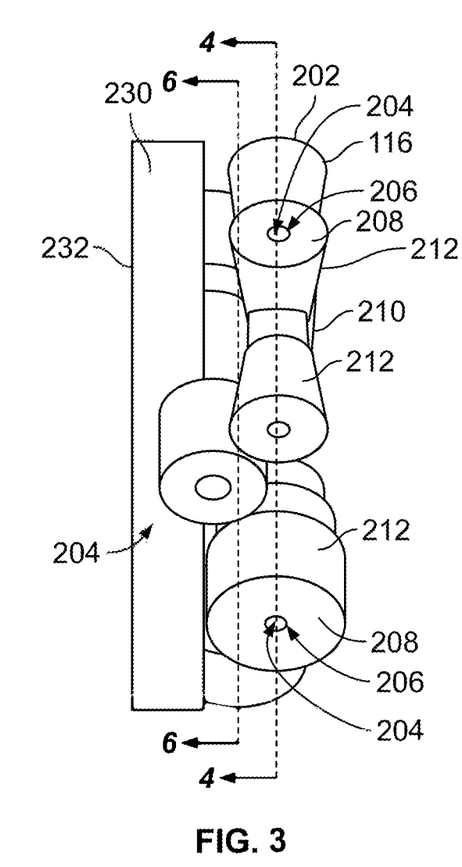
FIG. 3 is an isolated side view of the additively-manufactured build part shown in FIG. 2.

FIG. 2 is a front-facing view of the additively-manufactured build part 116, according to an embodiment, disposed on the platform 102 of the AM system 100 (shown in FIG. 1). FIG. 2 represents a period of time during the manufacturing process after the additive deposition and fusing of material to form the part 116 is complete, and prior to the post-processing stage. The part 116 in FIG. 2 is supported on the platform 102 by a support 120. FIG. 3 is an isolated side view of the additively-manufactured build part 116 shown in FIG. 2.

With reference to both FIGS. 2 and 3, the part 116 includes a three-dimensional body 202. The body 202 is additively manufactured, as described above, such that the body 202 is defined by multiple layers (e.g., 114 shown in FIG. 1) of material consecutively stacked in the build direction 124 along the build axis 126 and fused together. The build axis 124 is orthogonal to the build surface 110 of the platform 102 in FIG. 2.

The body 202 is formed to define one or more fluid channels 204 therethrough. In the illustrated embodiment, the body 202 has multiple fluid channels 204, but the body 202 has only a single fluid channel 204 in another embodiment. The fluid channels 204 are configured to direct fluid through the interior of the body 202. Each fluid channel 204 defines at least one port 206 that is open along an exterior surface 208 of the body 202. The ports 206 allow the ingress and egress of fluid. The fluid channels 204 are broadly used to direct various different types of material therethrough, such as liquids, gases, and flowable semi-solid compositions (e.g., gels, foams, etc.). The fluid channels 204 optionally are round or at least substantially round, as shown by the round ports 206 visible in FIG. 3. The round fluid channels 204 have a circular cross-sectional area. The cross-sectional area represents a plane orthogonal to the centerline or length dimensions of the channel 204. A substantially-round fluid channel 204, although not shown, may have a cross-sectional shape that is characterized as an ellipse, an oval, a hexagon, an octagon, planar sides between curved ends, or the like.

In an embodiment, the body 202 is a shell 210 that includes multiple interconnected pipes 212. The pipes 212 define at least some of the fluid channels 204. The shell 210 can be produced via a shelling design process in which the physical structure of the body 202 is defined based on a desired arrangement of the fluid channels 204. For example, once the fluid channels 204 are mapped, the dimensions of the physical body 202 are determined to define the fluid channels 204 with adequate wall thicknesses for structural integrity based on application-specific uses. The body 202 in the illustrated embodiment includes a primary pipe 214 and multiple branch pipes 216 intersecting the primary pipe 214. At least some of the branch pipes 216 connect to the primary pipe 214 at different locations along the length of the primary pipe 214. The primary pipe 214 extends from a first end 218 to a second end 220 that is opposite to the first end 218. The primary pipe 214 can be used to distribute fluid to the fluid channels 204 of the branch pipes 216 and/or collect fluid from the fluid channels 204 of the branch pipes 216.

In a non-limiting application, the illustrated part 116 is a hydraulic manifold. The hydraulic manifold is configured to be installed in a vehicle or other equipment. The vehicle can be an aircraft, an automobile, a marine vessel, a rail vehicle, or the like. The pipes 212 of the manifold can be connected to various tubes, sensors, valves, and/or the like. The hydraulic manifold represents a single application, and the embodiments described herein can be used to additively manufacture a vast array of different types of build parts that define one or more internal channels therethrough.

In one or more embodiments, the body 202 of the part 116 is specifically designed and oriented relative to the build direction 124 to obviate the need for internal support structures within the fluid channels 204 during the additive-manufacturing build process. For example, the internal support structures can be eliminated without reducing the diameter of the fluid channels, changing the source material to have increased adhesion or other characteristics, or the like. In an embodiment, the fluid channels 204 have a sufficient size that would typically require internal support structures to support overhanging features during the build process. Non-limiting example diameters of the channels 204 include at least 10 mm (0.394 in), at least 15 mm (0.59 in), at least 20 mm (0.79 in), or the like. The body 202 of the part 116 is specifically designed and oriented to obviate the need for the internal support structures by limiting the angles of the fluid channels 204 relative to the build direction 124 to eliminate overhanging features of the fluid channels 204 that project at, or proximate to, right angles relative to the build direction 124.

In FIG. 2, a line 222 that extends from the first end 218 of the primary pipe 214 to the second end 220 of the primary pipe 214 is oriented at an oblique angle 224 relative to the build axis 126. For example, the angle 224 between the line 222 and the build axis 126 is greater than 0 degrees and less than 90 degrees (e.g., neither parallel nor perpendicular). In an embodiment, the angle 224 is less than a designated maximum offset angle 226. The maximum offset angle 226 refers to an upper limit on offset angles relative to the build axis 126 (e.g., the build direction 124). The maximum offset angle 226 optionally is utilized as a constraint or limitation when designing the build part 116 and selecting the part orientation relative to the platform 102. The maximum offset angle 226 can be determined or calculated based on material properties of the source material (e.g., material 111), structural properties of the build part (e.g., the part 116), and/or properties of the additive manufacturing system used to generate the part (e.g., the AM system 100). For example, larger fluid channel 204 diameters cause the maximum offset angle 226 to be reduced relative to narrower channels 204 because the overhanging segments of larger-diameter channels may be more prone to distortion, without the presence of internal supports, due to less inherent support. Alternatively, the maximum offset angle 226 is user-selected by an operator using the additive manufacturing system, a manufacturer of the additive manufacturing system, or the like.

Fluid channels 204 are permitted to have orientations relative to the build axis 126 within the range of angles defined by the maximum offset angle 226. In an embodiment, the maximum offset angle 226 is no greater than 75 degrees. For example, the maximum offset angle 226 may be 75 degrees, so the maximum extent that an overhanging feature of a fluid channel 204 laterally projects relative to the build axis 126 is 75 degrees. Optionally, the maximum offset angle 226 is lower than 75 degrees, such as 70 degrees, 65 degrees, 60 degrees, 55 degrees, 50 degrees, 45 degrees, or the like, including intervening angles between the mentioned angles. The fluid channels 204 may define relative angles with the build axis 126 that are significantly below the maximum offset angle 226, such as at least 10% below, at least 20% below, or the like, throughout the lengths of the fluid channels 204. By limiting the angular orientation of each of the fluid channels 204 relative to the build axis 126 (e.g., direction 124), the body 202 of the part 116 can be additively manufactured on the platform 102 without the use of internal support structures within the fluid channels 204. For example, the body 202 shown in FIGS. 2 and 3 is free of any internal support structures.

Optionally, the build part 116 also includes a bracket or fixture 230 that is additively manufactured with the body 202. The bracket 230 is integrally connected to the body 202. The bracket 230 is used for mounting the body 202 to an application, such as to a vehicle chassis. The bracket 230 may include linear panels with planar sides 232. In an alternative embodiment, the build part 116 lacks the bracket 230.

Optionally, the build part 116 includes external stiffeners 234 that extend between and connect different pipes 212 to provide mechanical strength and rigidity to the body 202. The external stiffeners 234 in the illustrated embodiment are angled relative to the pipes 212, such as at 45-degree angles. The build part 116 is oriented such that the stiffeners 234 are elongated parallel to or generally parallel to (e.g., within 5 degrees, 10 degrees, or the like of parallel) the build axis 126. The stiffeners 234 in an embodiment are integral components that are not removed from the body 202 during post-processing. Alternatively, the stiffeners 234 are removed during post-processing.

Figure 4:
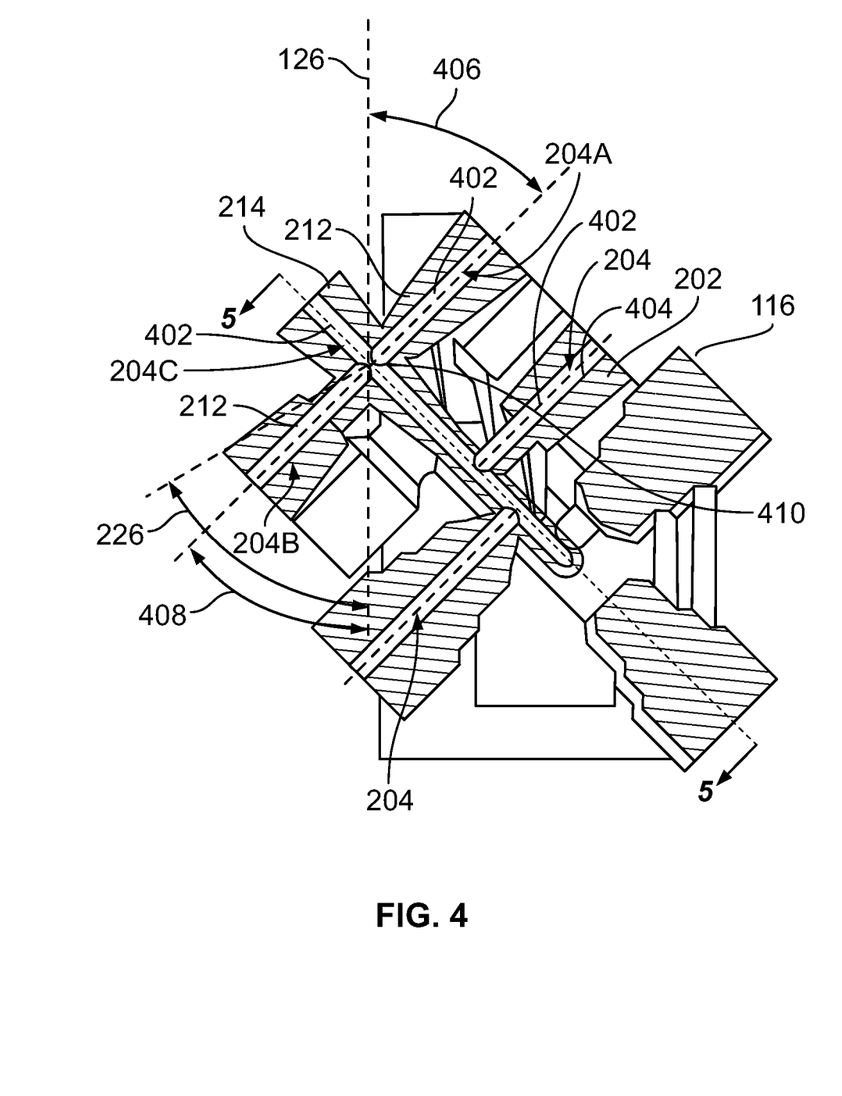
FIG. 4 is a cross-sectional view of the additively-manufactured build part taken along line 4-4 in FIG. 3.
Figure 5:
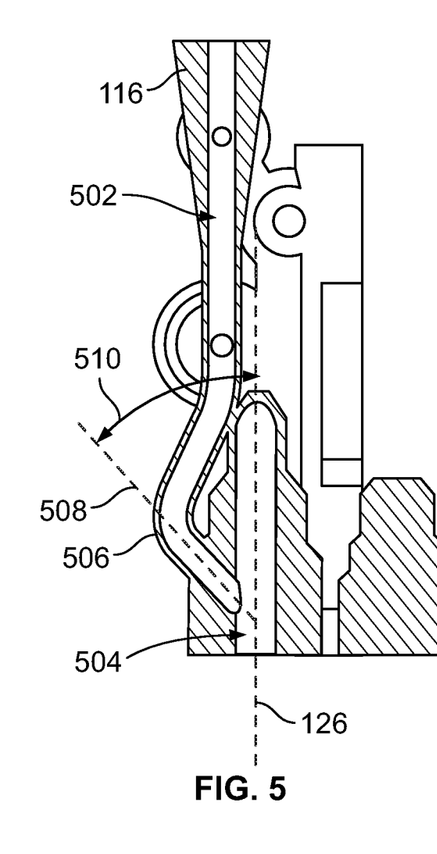
FIG. 5 is a cross-sectional view of the additively-manufactured build part taken along line 5-5 in FIG. 4.

FIG. 4 is a cross-sectional view of the additively-manufactured build part 116 taken along line 4-4 in FIG. 3. The cross-sectional view in FIG. 4 shows multiple sectioned fluid channels 204. Each of the fluid channels 204 defines a respective centerline 402, shown in dashed lines in FIG. 4, that extends the length of the fluid channel 204. The fluid channels 204 are defined by inner walls 404 of the body 202. The inner walls 404 are either curved or planar. In an embodiment, the fluid channels 204 are cylindrical, with circular cross-sections, and each is defined by a single curved inner wall 404 that extends around the perimeter. The centerline 402 is centered relative to the one or more inner walls 404 that define the fluid channel 204. Although the segments of the fluid channels 204 shown in FIG. 4 are linear, other segments of the fluid channels 204 can have other orientations, as shown in FIG. 5 for example.

In one or more embodiments, the fluid channels 204 are oriented such that the centerlines 402 are angled no greater than the maximum offset angle 226 relative to the build axis 126 throughout the lengths of the fluid channels. For example, in FIG. 4, the centerline 402 of a first fluid channel 204A defines a first angle 406 relative to the build axis 126. The centerline 402 of a second fluid channel 204B defines a second angle 408 relative to the build axis 126. The first and second angles 406, 408 are both less than the maximum offset angle 226. Therefore, no internal support is needed during the additive manufacturing build process to maintain the shape of the fluid channels 204A, 204B. In an embodiment, each of the fluid channels 204 in the build part 116 is designed such that the respective centerline 402 is angled no greater than the maximum offset angle 226 relative to the build axis 126 throughout the length of the respective fluid channel 204. For example, even if a fluid channel 204 has a segment that bends, curves, has a compound angle, or the like, the centerline 402 along such segment does not exceed the maximum offset angle 226 relative to the build axis 126. In an alternative embodiment, a limited number (e.g., one, two, less than half, etc.) of the fluid channels are allowed to define angles with the build axis 126 that exceed the maximum offset angle 226, and such fluid channels are built with internal support structures therein for post-processing removal.

In FIG. 4, the first and second channels 204A, 204B are defined by bridge pipes 212, and are referred to as bridge fluid channels 204A, 204B. Both bridge fluid channels 204A, 204B intersect the fluid channel 204C (e.g., primary fluid channel) defined by the primary pipe 214. In FIG. 4, the bridge fluid channels 204A, 204B and the primary fluid channel 204C intersect at a juncture location 410 within the body 202. The centerline 402 of each of the fluid channels 204A, 204B, 204C extending from the juncture location 410 is angled no greater than the maximum offset angle 226 relative to the build axis 126. It is noted however, that the centerlines 402 of the intersecting fluid channels 204A, 204B, 204C may define relative angles between each other that are greater than 75 degrees (e.g., the maximum offset angle 126). In a non-limiting example, the primary fluid channel 204C is orthogonal to the first and second branch fluid channels 204A, 204B.

Conventionally, additively-manufactured build parts similar to the build part 116 are formed at an orientation such that the primary pipe 214 is either vertical or horizontal. If the build part 116 shown in FIG. 4 was formed in such an orientation, either the primary pipe 214 or the branch pipes 212 would project orthogonally relative to the build axis 126 and would therefore require internal supports within the fluid channels 204. In the illustrated embedment, by orienting the part 116 such that the primary pipe 214 is oblique to the build axis 126, the fluid channels 204 can be formed without the use of internal support structures.

The build part 116 is configured to be able to define fluid channels 204 that have varying properties, such as curves and bends in three dimensions (e.g., not limited to a single plane), broadening segments, narrowing segments, branched intersections (as shown in FIG. 4), and the like. FIG. 5 is a cross-sectional view of the additively-manufactured build part 116 taken along line 5-5 in FIG. 4. FIG. 5 shows a first fluid channel 502 that branches off a second fluid channel 504. The first fluid channel 502 has a curved segment 506 extending from the intersection with the second fluid channel 504. The centerline 508 of the first fluid channel 502 is angled no greater than the maximum offset angle 226 (shown in FIG. 4) relative to the build axis 126, even along the length of the curved segment 506. For example, an angle 510 defined between the build axis 126 and the centerline 508 along the curved segment 506 is less than the maximum offset angle 226.

Figure 6:
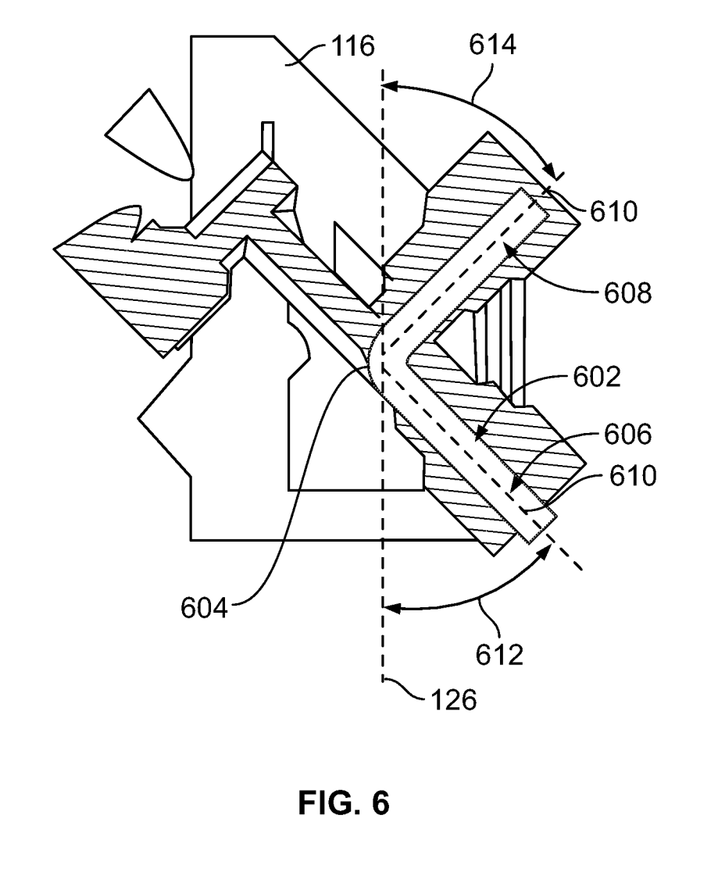
FIG. 6 is a cross-sectional view of the additively-manufactured build part taken along line 6-6 in FIG. 3.

FIG. 6 is a cross-sectional view of the additively-manufactured build part 116 taken along line 6-6 in FIG. 3. FIG. 6 shows a fluid channel 602 that has a bend 604 along the length of the fluid channel 602. The bend 604 optionally represents a right-angle turn. The fluid channel 602 has a first segment 606 and a second segment 608 extending from the bend 604. The centerline 610 of each of the first and second segments 606, 608 is angled no greater than the maximum offset angle 226 (shown in FIG. 4) relative to the build axis 126, even though the fluid channel 602 itself bends at an angle that is greater than the maximum offset angle 226. For example, an angle 612 defined between the build axis 126 and the centerline 610 of the first segment 606 is less than the maximum offset angle 226. Similarly, an angle 614 defined between the build axis 126 and the centerline 610 of the second segment 608 is less than the maximum offset angle 226.

Figure 7:
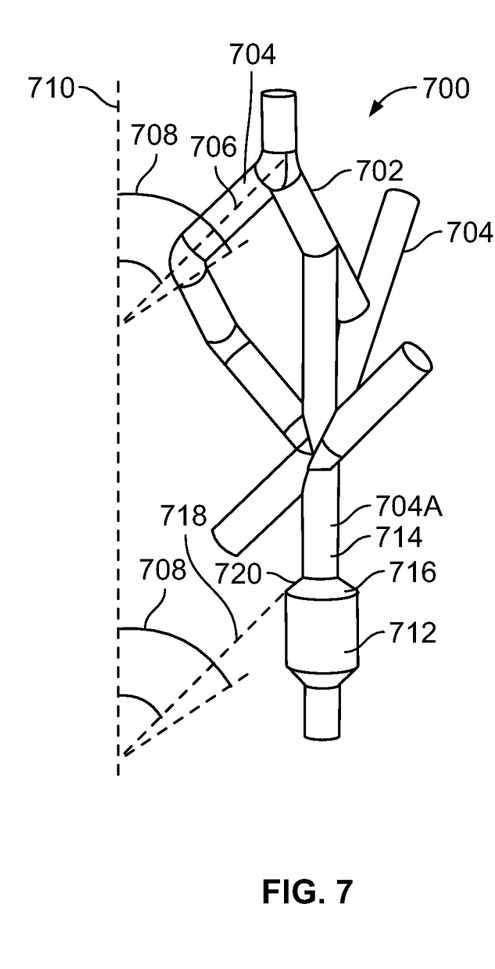
FIG. 7 is a negative of a network of interconnected fluid channels according to an embodiment of the present disclosure.

FIG. 7 is a negative 700 of a network 702 of interconnected fluid channels 704 according to an embodiment of the present disclosure. The negative 700 illustrates voids as physical structure and omits actual physical structure, such as walls that define the voids. In the illustrated embodiment, the network 702 is designed such that the centerlines 706 of all of the fluid channels 704 are angled no greater than a maximum offset angle 708 relative to a build axis 710. Furthermore, all of the fluid channels 704 in FIG. 7 have circular cross-sections. In the illustrated embodiment, a first fluid channel 704A in the network 702 has a broad diameter segment 712, a narrow diameter segment 714, and a transition region 716 extending from the broad diameter segment 712 to the narrow diameter segment 714. Thus, the diameter of the fluid channel 704A varies along the length. In an embodiment, the transition region 716 has a conical shape. A tangent line 718 extending from an inner wall 720 of the first fluid channel 704A along the conical transition region 716 is also within the designated angle range relative to the build axis 710. For example, an angle 722 defined between the build axis 710 and the tangent line 718 extending from the inner wall 720 along the transition region 716 is less than the maximum offset angle 226. Therefore, no internal supports are needed during the build process to support the diameter change along the first fluid channel 704A.

Figure 8:
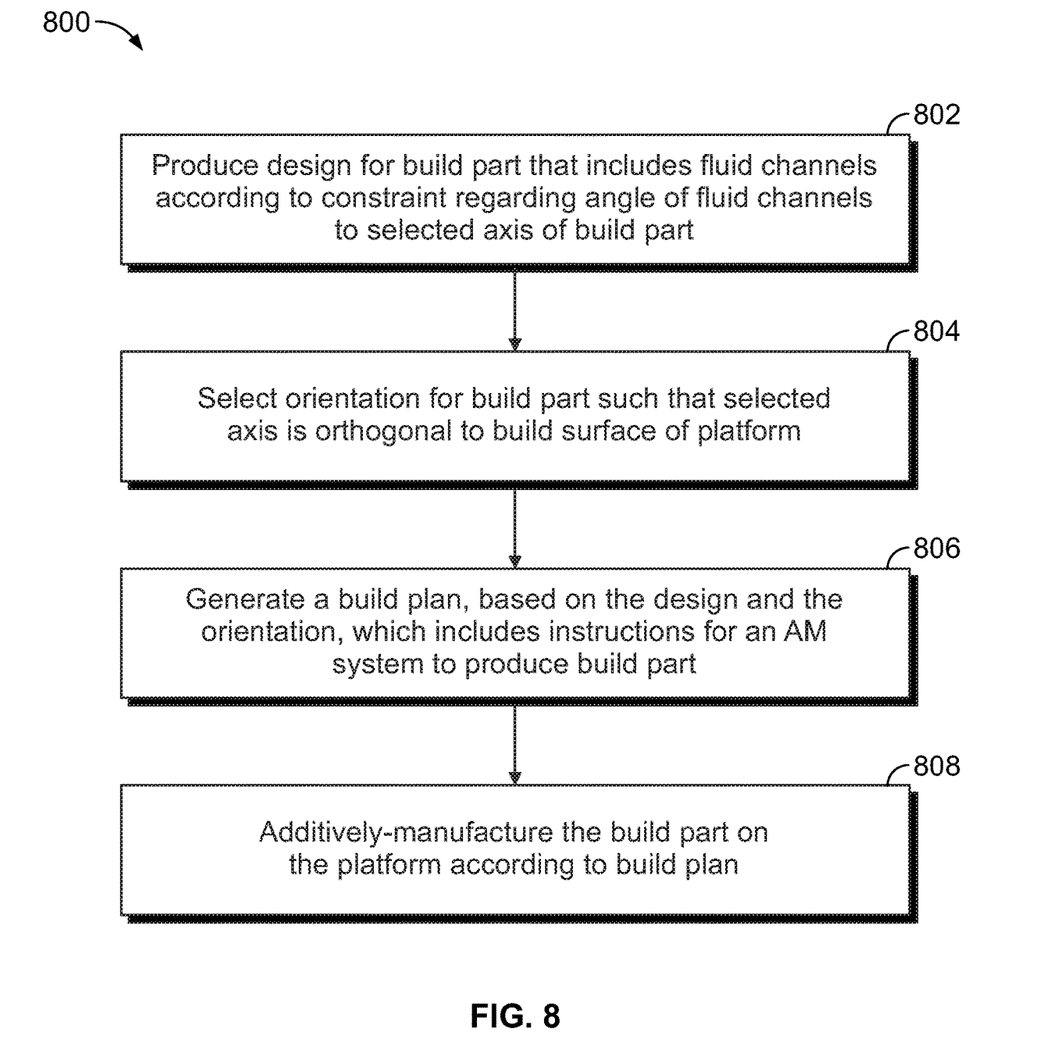
FIG. 8 is a flow chart of a method for additively-manufacturing a build part that includes internal channels according to an embodiment of the present disclosure.

FIG. 8 is a flow chart of a method 800 for additively-manufacturing a build part that includes internal channels according to an embodiment of the present disclosure. The method 800 is configured to produce build parts that require limited post-processing. For example, post-processing is limited because the build parts are fabricated with a limited amount of, if any, internal support structures within the internal channels that must be removed during post-processing. In an embodiment, the method 800 is performed in whole or in part by the one or more processors 118 of the control unit 108 shown in FIG. 1. Optionally, some operator input may be provided in one or more of the steps, such as step 802 and/or step 804.

The method 800 begins at 802, at which a build part is designed that includes fluid channels extending through a body of the build part. Optionally, the build part is designed with one or more constraints or limitations. One constraint regards the angle of the fluid channels to a selected axis of the build part. For example, the constraint dictates that the centerlines of the fluid channels, throughout the respective lengths of the fluid channels, are angled no greater than a maximum offset angle relative to the selected axis of the build part. In an embodiment, the maximum offset angle is no greater than 75 degrees. For example, the maximum offset angle can be 70 degrees, 65 degrees, 60 degrees, 55 degrees, 50 degrees, 45 degrees, or the like. The selected axis can be any axis through the build part. For example, an operator or a control system chooses or designates the selected axis based on the layout of the prescribed fluid channels.

At 804, an orientation for the build part relative to a build surface of a platform is selected. The orientation is determined such that the selected axis is orthogonal to the build surface and/or parallel to a build direction. The build direction represents a direction relative to the build surface along which the build part will grow, layer by layer, during the additive manufacturing process.

At 806, a build plan is generated based on the design of the build part and the orientation relative to the platform. The build plan includes instructions for an additive manufacturing system to produce the build part on the platform. For example, the instructions designate operating settings, such as settings of an applicator device that deposits layers of material and settings of an energy source that fuses the material to the build part. The instructions designate control steps, such as a path for the energy source to follow relative to the platform for each layer to fuse designated portions of the material to the build part.

At 808, the build part is additively-manufactured on the platform according to the build plan. The additive manufacturing process includes consecutively depositing and fusing layers of material in a stack according to the build plan. In an embodiment, the layers of material include one or more metal powders, such that the build part is composed of at least one metal. The built part is manufactured to produce a body that defines one or more fluid channels therethrough for directing fluid through the built part. Optionally, one or more of the fluid channels that are formed have a circular cross-sectional shape. Optionally, the build part represents a shell that includes multiple interconnected pipes, with the pipes defining the fluid channels.

In at least one embodiment, the additive manufacturing process generates the one or more fluid channels such that a centerline of each respective fluid channel is angled no greater than the maximum offset angle relative to the build axis. By specifically designing and orienting the build part based on this angle constraint, the one or more fluid channels can be free of internal support structures as the layers are deposited and fused to define the one or more fluid channels. By eliminating the need for internal support structures within the fluid channels, there may be no post-processing task of cutting and grinding away internal support structures from hard-to-reach channels. As a result, the post-processing may be substantially quicker, less energy intensive, and less costly. Furthermore, by eliminating internal support structures, there is little or no risk of small residual metal features in the fluid channels caused by the failure to fully remove all of the internal support structure material.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 108 shown in FIG. 1. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 108, or the one or more processors 118 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 108 shown in FIG. 1 is configured to execute a set of instructions that are stored in one or more storage elements (such as one or more memories), in order to process data. The set of instructions includes various commands that instruct the control unit 108 (e.g., the processor(s) 118 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
additively-manufacturing a build part by consecutively depositing and fusing layers of material in a stack oriented along a build axis, wherein the layers of material are consecutively deposited and fused according to a build plan to define one or more fluid channels through the build part for directing fluid through the build part,
wherein the layers of material are consecutively deposited and fused to orient each of the one or more fluid channels such that a centerline of the respective fluid channel is angled no greater than a maximum offset angle relative to the build axis throughout the length of the respective fluid channel, wherein the maximum offset angle is no less than 45 degrees and no greater than 75 degrees, and
wherein the layers of material are consecutively deposited and fused such that at least one of: (i) a first fluid channel of the one or more fluid channels includes a bend that separates a first segment of the first fluid channel from a second segment of the first fluid channel, and the centerline of the first fluid channel along the first segment is angled greater than the maximum offset angle relative to the centerline along the second segment; or (ii) the first fluid channel intersects a second fluid channel of the one or more fluid channels at a juncture location, and the centerline of the first fluid channel extending from the juncture location is angled greater than the maximum offset angle relative to the centerline of the second fluid channel extending from the juncture location.

2. The method of claim 1, wherein the layers of material are consecutively deposited in the stack located on a platform such that the build part grows in a build direction relative to the platform, the build axis parallel to the build direction.

3. The method of claim 1, wherein the maximum offset angle is no greater than 60 degrees.

4. The method of claim 1, wherein the layers of material are consecutively deposited and fused such that the one or more fluid channels are free of internal support structures as the layers are deposited and fused to define the one or more fluid channels.

5. The method of claim 1, wherein the layers of material are consecutively deposited and fused such that at least a subset of the one or more fluid channels has a circular cross-sectional shape.

6. The method of claim 1, wherein the one or more fluid channels include multiple fluid channels, and additively-manufacturing the build part includes consecutively depositing and fusing the layers of material to define a hydraulic manifold that includes multiple interconnected pipes defining the fluid channels.

7. The method of claim 1, wherein the build part is produced such that the first fluid channel intersects the second fluid channel at the juncture location, wherein the centerline of the first fluid channel extending from the juncture location is angled no greater than the maximum offset angle relative to the build axis, and the centerline of the second fluid channel extending from the juncture location is angled no greater than the maximum offset angle.

8. The method of claim 1, wherein the build part is produced such that the first fluid channel includes the bend, and the centerline of the first fluid channel, along the length of the bend, is angled no greater than the maximum offset angle relative to the build axis.

9. The method of claim 1, wherein the layers of material are composed of at least one metal.

10. The method of claim 1, wherein the layers of material are consecutively deposited and fused such that the first fluid channel has a broad diameter section, a narrow diameter section, and a transition region extending from the broad diameter section to the narrow diameter section, and a tangent line extending from an inner wall of the first fluid channel along the transition region is angled no greater than the maximum offset angle relative to the build axis.

11. The method of claim 1, wherein the layers of material are consecutively deposited and fused such that the one or more fluid channels include a primary fluid channel and multiple branch fluid channels that intersect the primary fluid channel at different locations along the length of the primary fluid channel, and wherein a line extending from a first end of the primary fluid channel to a second end of the primary fluid channel opposite the first end is oblique relative to the build axis.

12. A method comprising:
producing a design for a build part that includes plural fluid channels extending through a body of the build part with at least some of the fluid channels extending in different directions and intersecting one another within the body, wherein producing the design includes determining a selected axis through the build part which is oriented no greater than a maximum offset angle relative to a respective centerline of each of the fluid channels, throughout the respective lengths of the fluid channels, the maximum offset angle being no less than 45 degrees and no greater than 75 degrees;
selecting an orientation for the build part relative to a build surface of a platform such that the selected axis is orthogonal to the build surface; and
generating, via one or more processors, a build plan based on the design and the orientation, the build plan including instructions for an additive manufacturing system to produce the build part on the platform in a build direction parallel to the selected axis.

13. The method of claim 12, further comprising additively-manufacturing the build part by consecutively depositing and fusing layers of material in a stack according to the build plan.

14. The method of claim 12, wherein the design is produced such that at least one of: (i) a first fluid channel of the fluid channels includes a bend that separates a first segment of the first fluid channel from a second segment of the first fluid channel, and the centerline of the first fluid channel along the first segment is angled greater than the maximum offset angle relative to the centerline along the second segment; or (ii) the first fluid channel intersects a second fluid channel of the fluid channels at a juncture location, and the centerline of the first fluid channel extending from the juncture location is angled greater than the maximum offset angle relative to the centerline of the second fluid channel extending from the juncture location.

15. The method of claim 12, wherein the maximum offset angle is no greater than 60 degrees.

16. The method of claim 12, wherein the build plan is generated such that the fluid channels are free of internal support structures as the build part is produced on the platform.

17. The method of claim 12, wherein the build plan is generated such that build part is composed of at least one metal as the build part is produced on the platform.

18. The method of claim 12, wherein the design for the build part is produced such that the build part represents a hydraulic manifold that includes multiple interconnected pipes defining the fluid channels.

19. The method of claim 12, wherein a first fluid channel of the fluid channels has a broad diameter section, a narrow diameter section, and a transition region extending from the broad diameter section to the narrow diameter section, wherein the orientation for the build part is selected relative to the build surface such that a tangent line extending from an inner wall of the first fluid channel along the transition region is angled no greater than the maximum offset angle relative to the selected axis.

20. The method of claim 12, wherein the fluid channels include a primary fluid channel and multiple branch fluid channels that intersect the primary fluid channel at different locations along the length of the primary fluid channel, wherein the orientation for the build part is selected relative to the build surface such that a line extending from a first end of the primary fluid channel to a second end of the primary fluid channel opposite the first end is oblique relative to the selected axis.

* * * * *